US006962043B2

United States Patent
Venkateswaran et al.

(10) Patent No.: US 6,962,043 B2
(45) Date of Patent: Nov. 8, 2005

(54) METHOD AND APPARATUS FOR MONITORING THE PERFORMANCE OF A GAS TURBINE SYSTEM

(75) Inventors: Narayanan Venkateswaran, New Thippasandra Bangalore (IN); Minesh Ashok Shah, Clifton Park, NY (US); Bruce Gordon Norman, Charlton, NY (US)

(73) Assignee: General Electric Company, Niskayuna, NY (US)

( * ) Notice: Subject to any disclaimer, the term of this patent is extended or adjusted under 35 U.S.C. 154(b) by 92 days.

(21) Appl. No.: 10/354,824

(22) Filed: Jan. 30, 2003

(65) Prior Publication Data

US 2004/0148940 A1 Aug. 5, 2004

(51) Int. Cl.[7] .............................. F02C 7/00; F02C 9/00
(52) U.S. Cl. .................................... 60/39.091; 60/39.24
(58) Field of Search ........................ 60/39.091, 39.13, 60/39.24–39.3

(56) References Cited

U.S. PATENT DOCUMENTS

| 3,727,400 | A | | 4/1973 | Harrison et al. | |
|---|---|---|---|---|---|
| 4,115,998 | A | * | 9/1978 | Gilbert et al. | 60/39.091 |
| 4,283,634 | A | | 8/1981 | Yannone et al. | |
| 4,455,820 | A | * | 6/1984 | Buckley et al. | 60/773 |
| 5,024,055 | A | * | 6/1991 | Sato et al. | 60/39.27 |
| 5,148,667 | A | * | 9/1992 | Morey | 60/779 |
| 5,165,223 | A | | 11/1992 | Ingham et al. | |
| 6,003,296 | A | * | 12/1999 | Citeno et al. | 60/772 |
| 6,460,346 | B1 | * | 10/2002 | Cleary | 60/779 |
| 2002/0123870 | A1 | | 9/2002 | Chan et al. | |

FOREIGN PATENT DOCUMENTS

JP 07-317566 * 5/1995

OTHER PUBLICATIONS

US 2002/0150142 A1, Sanderson, "Sensors and Methodology for Improved Turbine Exhause Gas Temperature Measurements," Oct. 17, 2002.
US 2002/0178730 A1, Ganz et al, "Gas Turbine," Dec. 5, 2002.
US 2002/0183916 A1, Cleary, "Method and System for Identifying Malfunctioning Comobustion Chambers in a Gas Turbine," Dec. 5, 2002.
EP Search Report, EP 04250458, Jun. 22, 2004.

* cited by examiner

*Primary Examiner*—Ted Kim
(74) *Attorney, Agent, or Firm*—Paul J. DiConza; Patrick K. Patnode (57) ABSTRACT

A method for monitoring performance of a gas turbine system comprises providing a plurality of combustor cans; placing a plurality of temperature sensors circumferentially around an exhaust plane of the plurality of combustor cans; operating the plurality of combustor cans while varying a plurality of gas turbine operating parameters, where exhaust gas issues from each combustor can of the plurality of combustor cans during operation; measuring temperature of the exhaust gas in the exhaust plane using the plurality of temperature sensors to obtain a plurality of individual temperature measurements; determining a correlation of the individual temperature measurements of exhaust gas temperature with corresponding individual combustor cans of the plurality of combustor cans issuing the exhaust gas; and developing a swirl model, where the model uses the correlation to predict swirl values in the exhaust plane as a function of the operating parameters.

10 Claims, 8 Drawing Sheets

METHOD AND APPARATUS FOR MONITORING THE PERFORMANCE OF A GAS TURBINE SYSTEM

BACKGROUND OF THE INVENTION

The present invention relates generally to gas turbine systems and more specifically to methods and apparatus for monitoring performance of gas turbine systems.

A gas turbine typically comprises a compressor for compressing air and a combustor where the compressed air from the compressor and gas fuel are mixed and burned. The hot gases from the combustor drive the turbine stages to generate power. Normally, for installed turbines, performance monitoring is done through daily checks and measurements and periodic performance tests. The results are later used for maintenance and repair diagnostic processes. For example, after a fault occurs the previously recorded trends of the machine are analyzed to identify the cause of failure, and maintenance action required to recover from the identified failure is conducted. There are limitations for such monitoring systems, as they identify the problem only after the fault has occurred. Therefore, present methods as described above generally are not able to predict and prevent turbine damage. Furthermore, due to inherent time delays associated with analyzing faults, determining failure causes, and identifying corrective action steps, use of present methods often results in undesirable lengths of repair time for critical turbine components.

In certain gas turbine monitoring devices, system modeling techniques use engine performance parameters to approximate thermodynamic processes within a gas turbine. In one such system, the engine pressure ratio (EPR) is monitored for a gas turbine engine and used as an independent variable to determine expected values of fuel flow, exhaust gas temperature, and rotational speed of the high pressure compressor stage for a properly operating theoretical engine of the type being monitored. Diode networks are arranged to effect voltage transfer characteristics that closely approximate the parametric relationship between EPR and one of the dependent variables such as, for example, fuel flow in the theoretical engine. The diode network provides expected values of operating parameters in an ideal condition. The signals from the actual engine and the expected values are supplied to an analog computational network to calculate deviation of the actual values from expected values as a means to detect anomalies. Such systems face a drawback in that they are not capable of precisely monitoring engine performance over the entire operation of the engine being monitored. Many system modeling techniques unrealistically assume that the values of engine performance parameters remain constant at different operating conditions, and most systems do not take into account the gradual deterioration in performance during an engine's operating life.

In gas turbines, exhaust temperature monitoring is desirable since high temperatures can cause damage to combustor elements, hot gas path parts, rotor blades, and the like. High exhaust gas temperatures may also cause emission levels of certain regulated compounds, such as nitrogen oxides, to rise above allowable limits. Temperature sensors, such as, for example, thermocouples, have been used in prior art systems to determine the temperature of discharges gases in the turbine combustor. Though temperature monitoring provides information important to increased turbine reliability, this technique alone generally is not sufficient in the identification of particular components operating in, or at risk of operating in, an anomalous condition.

Therefore there is a need for an improved mechanism for monitoring the performance of a gas turbine system so that particular components causing anomalous operation may be identified and an informed prognosis may be made regarding the time the turbine can be operated until maintenance and repair procedures are required.

SUMMARY OF THE INVENTION

Briefly, in accordance with one aspect of the invention, a method for monitoring performance of a gas turbine system comprises providing a plurality of combustor cans; placing a plurality of temperature sensors circumferentially around an exhaust plane of the plurality of combustor cans; operating the plurality of combustor cans while varying a plurality of operating parameters, where exhaust gas issues from each combustor can of the plurality of combustor cans during operation; measuring temperature of the exhaust gas in the exhaust plane using the plurality of temperature sensors to obtain a plurality of individual temperature measurements; determining a correlation of the individual temperature measurements of exhaust gas temperature with corresponding individual combustor cans of the plurality of combustor cans issuing the exhaust gas; and developing a swirl model, where the model uses the correlation to predict swirl values in the exhaust plane as a function of the operating parameters.

In accordance with another aspect of the invention, a method for monitoring performance of a gas turbine system comprises providing a plurality of combustor cans; placing a plurality of temperature sensors circumferentially around an exhaust plane of the plurality of combustor cans; operating the plurality of combustor cans while varying a plurality of gas turbine operating parameters, where exhaust gas issues from each combustor can of the plurality of combustor cans during operation, where varying a plurality of gas turbine operating parameters comprises varying each of the gas turbine operating parameters within a respective value range, the respective value range ranging from a respective value used at a start-up condition for the plurality of combustor cans to a respective value used at a base load condition for the plurality of combustor cans, and where the gas turbine operating parameters comprise at least one of inlet guide vane angle, compressor discharge pressure, fuel flow rate, compressor discharge temperature, corrected mass flow rate, output power; measuring the temperature of the exhaust gas in the exhaust plane using the plurality of temperature sensors, wherein measuring the temperature of the exhaust gas in the exhaust plane comprises creating an exhaust gas temperature profile within the exhaust plane, the profile comprising a plurality of local maximum points, where each local maximum point corresponds to one of the combustor cans of the plurality of combustor cans; determining a correlation of individual temperature measurements of exhaust gas temperature with corresponding individual combustor cans issuing the exhaust gas, wherein determining the correlation comprises correlating each local maximum point of the plurality of local maximum points with its corresponding combustor can; developing a swirl model, wherein the model uses the correlation to determine a swirl value in the exhaust plane as a function of the gas turbine operating parameters; setting the plurality of combustor cans to operate at a selected set of predetermined operating conditions; obtaining real-time exhaust gas temperature data during operation of the plurality of combustor cans at the selected set of operating conditions; calculating an actual swirl value based upon the real-time exhaust gas temperature data; calculating a predicted swirl value for the selected set of operating conditions using the model; comparing the actual swirl value and the predicted swirl value and generating at least one failure test statistic indicating a presence of faulty combustor can; wherein the at least one failure test statistic is a difference between the actual swirl value and the predicted swirl value, comparing the difference to a standard; generating at least one failure flag signal when the difference exceeds the standard, wherein the at least one failure flag signal indicates a presence of a failed combustor can in the plurality of combustor cans; and; generating at least one failure classification signal, where the failure classification signal identifies a particular failed combustor can from among the plurality of combustor cans.

In accordance with yet another aspect of the invention, a method for identifying potentially faulty combustor cans in a gas turbine system comprises setting a plurality of combustor cans in the gas turbine system to operate at a selected set of predetermined operating conditions; measuring real-time exhaust gas temperature data during operation of the plurality of combustor cans at the selected set of operating conditions using the plurality of temperature sensors; calculating an actual swirl value based upon the real-time exhaust gas temperature data; and calculating a predicted swirl value for the selected set of operating conditions using the model.

In accordance with one embodiment of the invention, an apparatus for monitoring gas turbine system performance comprises a sensor module adapted to sense a plurality of gas turbine operating parameters and temperature measurements during the operation of the gas turbine system, wherein the gas turbine system comprises a plurality of combustor cans; a data analysis module adapted to receive the plurality of gas turbine operating parameters and temperature measurements to generate at least one actual swirl value and at least one predicted swirl value; a statistic calculation module adapted to receive the at least one actual swirl value and at least one predicted swirl value and to generate at least one failure test statistic; and a failure detection module adapted to receive the at least one failure test statistic and to generate at least one failure flag signal, where the at least one failure flag signal indicates a presence of a failed combustor can in the plurality of combustor cans.

In accordance with another embodiment of the invention, a computer readable medium storing computer instructions for instructing a computer system to monitor a gas turbine system performance, the computer instructions comprise instructions for determining a correlation of individual temperature measurements of a plurality of exhaust gas temperature measurements with corresponding individual combustor cans of a plurality of combustor cans issuing the exhaust gas in an exhaust plane; and developing a swirl model, where the model uses the correlation to predict swirl values in the exhaust plane as a function of gas turbine operating parameters.

In accordance with yet another embodiment of the invention, a computer readable medium storing computer instructions for monitoring a gas turbine system performance, the computer instructions comprise determining a correlation of individual temperature measurements of a plurality of exhaust gas temperature measurements with corresponding individual combustor cans of a plurality of combustor cans issuing the exhaust gas in an exhaust plane, where the plurality of exhaust gas temperature measurements comprises an exhaust gas temperature profile within the exhaust plane, the profile comprising a plurality of local maximum points, wherein each local maximum point corresponds to one of the combustor cans of the plurality of combustor cans, and wherein determining the correlation comprises correlating each local maximum point of the plurality of local maximum points with its corresponding combustor can; developing a swirl model, where the model uses the correlation to determine a swirl value in the exhaust plane as a function of gas turbine operating parameters; calculating at least one actual swirl value based upon a real-time exhaust gas temperature data; calculating at least one predicted swirl value for a selected set of operating conditions using the model; comparing the actual swirl value and the predicted swirl value and generating at least one failure test statistic; comparing the failure test statistic to a standard; generating at least one failure flag signal when the failure test statistic exceeds the standard, wherein the at least one failure flag signal indicates a presence of a failed combustor can in the plurality of combustor cans; and generating at least one failure classification signal, wherein the failure classification signal identifies a particular failed combustor can from among the plurality of combustor cans.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
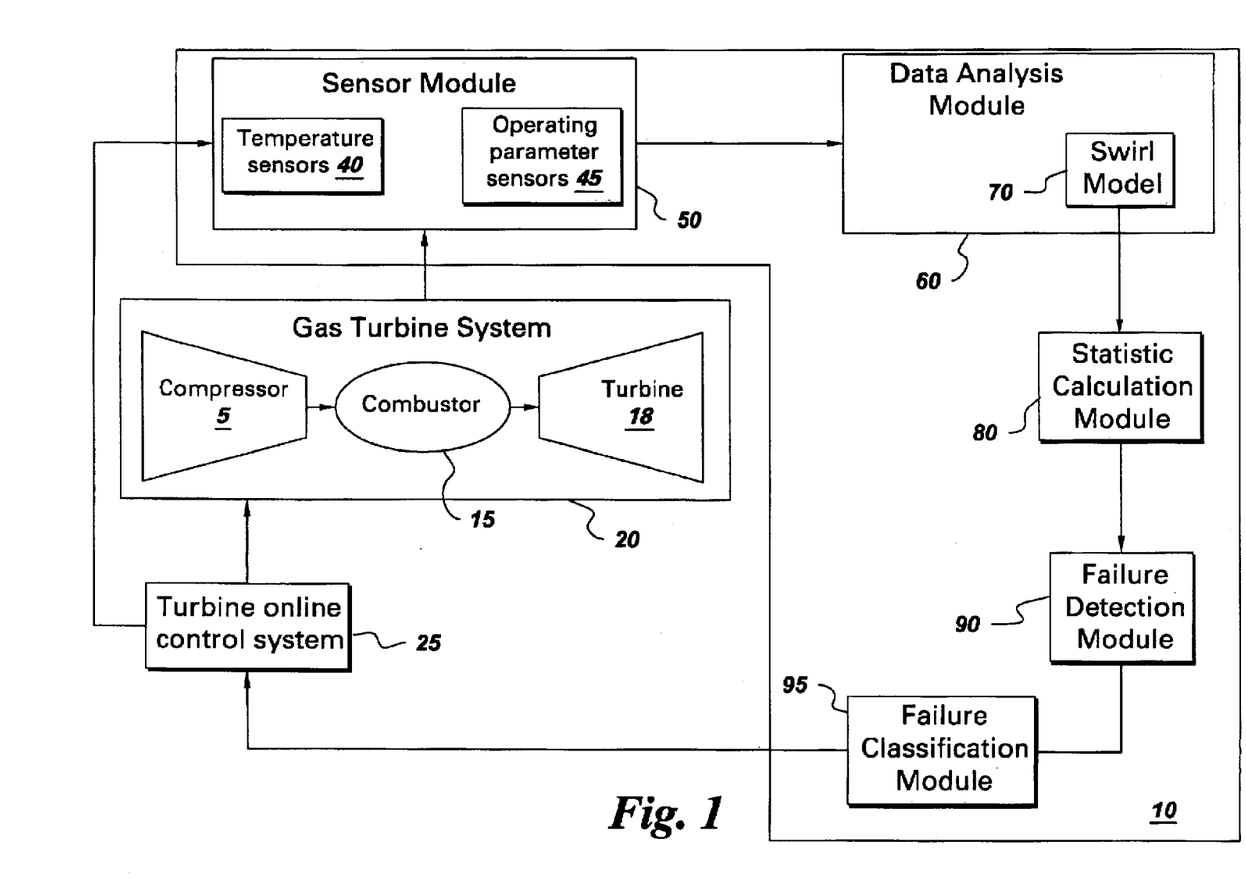
FIG. 1 illustrates a schematic for a gas turbine monitoring apparatus.
Figures 2A, 2B:
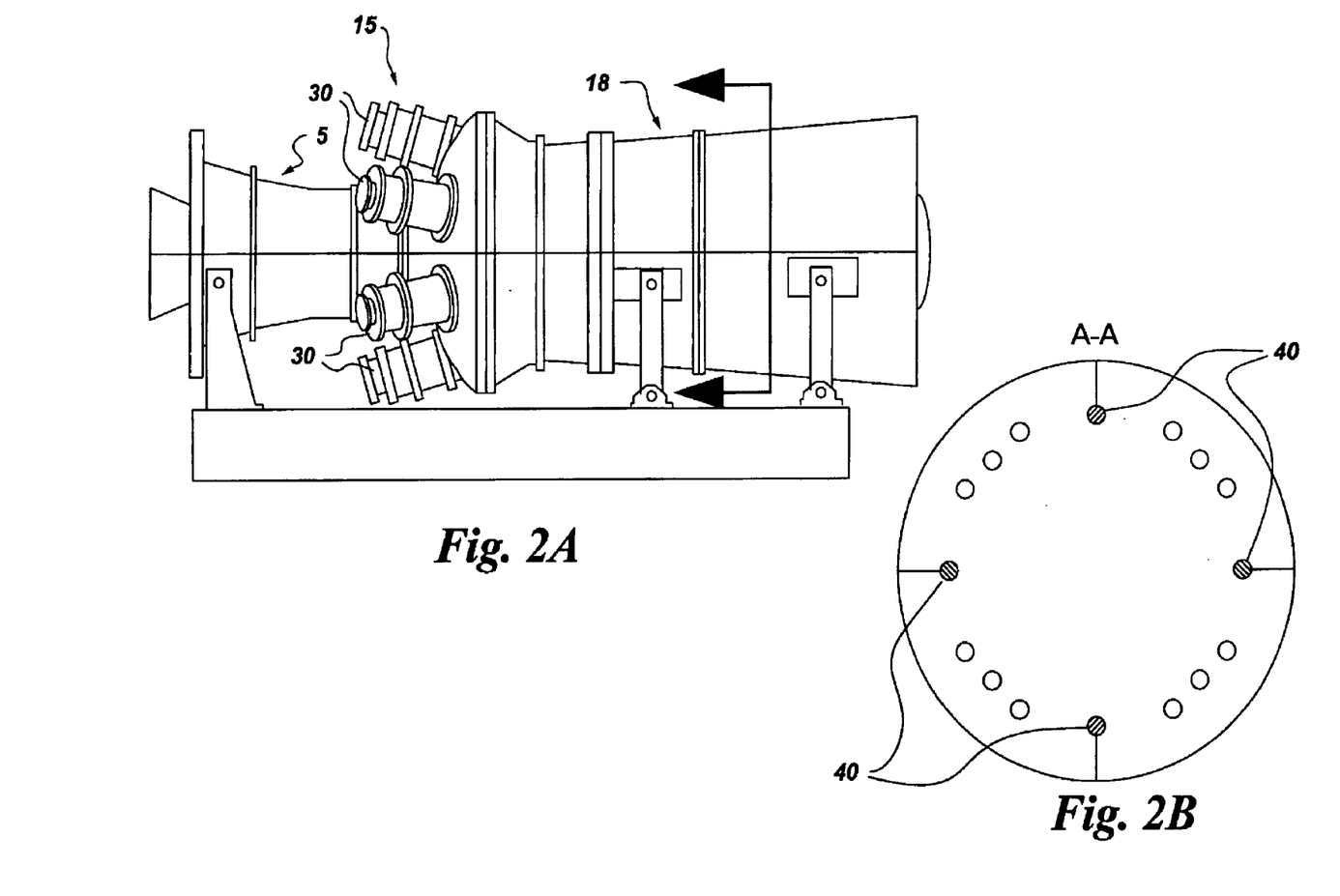
FIG. 2A illustrates a schematic for a gas turbine system used in FIG. 1 showing placement of combustor cans in a combustor and a cross-section AA at the exhaust of a turbine.
FIG. 2B illustrates a detailed view of cross-section AA of FIG. 2A showing an arrangement of temperature sensors.

Referring to FIG. 1, one embodiment of the present invention is an apparatus 10 for monitoring gas turbine system 20 performance. A typical gas turbine system 20 includes a compressor 5 for compressing air and feeding to a combustor 15 where the compressed air and a fuel gas are combusted to drive a turbine 18. The combustor 15 comprises a plurality of combustor cans 30 (shown in FIG. 2) for combusting the air and fuel gas. The apparatus 10 comprises a sensor module 50 adapted to sense a plurality of gas turbine operating parameters and temperature measurements during the operation of the gas turbine system 20. In an example of this embodiment, thermocouples are used as temperature sensors 40. The operating parameter sensors 45 are used for sensing a plurality of gas turbine operating parameters while operating the combustor cans. In certain embodiments, a plurality of temperature sensors 40 are arranged circumferentially at the exhaust of gas turbine in an exhaust plane of the plurality of combustor cans 30 as shown in FIG. 2. FIG. 2A shows a schematic of a gas turbine system 20 of FIG. 1 comprising a compressor 5, combustor 15 and turbine 18. The combustor 15 comprises combustor cans 30. The turbine cross-section AA is shown in a detailed view in FIG. 2B which shows an arrangement of temperature sensors 40 at the exhaust of the turbine 18. The exhaust plane is defined as a plane that is normal to the flow of exhaust gases and contains the temperature sensors arranged at the exhaust of the gas turbine. These temperature sensors 40, in specific embodiments, are components of a temperature-monitoring portion of an online control system 25 of the turbine system 20.

A data analysis module 60 is adapted to receive the plurality of gas turbine operating parameters and temperature measurements from the sensor module 50 and to generate at least one actual swirl value and at least one predicted swirl value, described in more detail below. A statistic calculation module 80 is adapted to receive the at least one actual swirl value and the at least predicted swirl value from the data analysis module 60 and to generate at least one failure test statistic. The failure test statistic in one example of the embodiment is a difference between the actual and predicted swirl values. A failure detection module 90 is adapted to receive the at least one failure test statistic from the statistic calculation module 80 and to generate at least one failure flag signal. The failure detection module 90 compares the failure test statistic to a standard and when the failure test statistic in its absolute value exceeds the standard, it generates the failure flag signal. The failure flag signal indicates a presence of a failed combustor can in the plurality of combustor cans. The comparison to a standard includes observing the difference between the actual and predicted swirl values i.e. the failure test statistic for each can over a period of time and then comparing a selected characteristic of the distribution of these failure test statistic values to a standard or a threshold value corresponding to the selected characteristic. Suitable examples of the standard include, for example, a root mean square error, or a mean of the difference between actual and predicted values or a standard deviation calculated on the basis of difference between actual and predicted values.

In certain specific embodiments a failure classification module 95 is included which is adapted to receive the at least one failure flag signal from the failure detection module 90 and to generate at least one failure classification signal, where the failure classification signal identifies a particular failed combustor can from among the plurality of combustor cans using the swirl map. The failure classification signal is communicated to the on line control system 25 of the turbine system 20 for taking appropriate maintenance and service actions.

Figure 3:
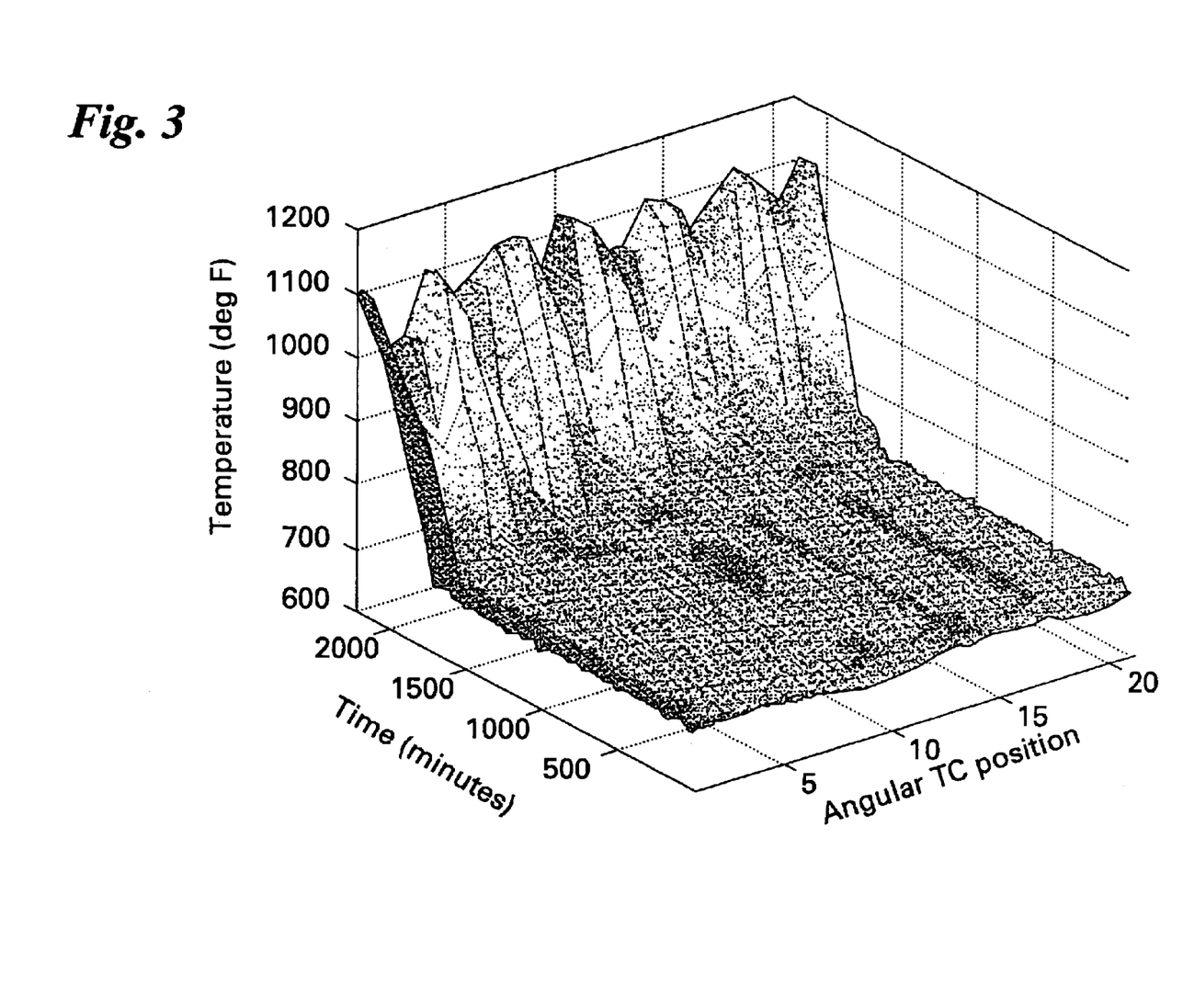
FIG. 3 illustrates an exhaust gas temperature profile in an exhaust plane for six cans.

In some embodiments, the data analysis module 60 creates an exhaust gas temperature profile within a given exhaust plane. As shown in FIG. 3, the profile includes a plurality of local maximum points. Each local maximum point corresponds to one of the combustor cans 30 (FIG. 2); the profile is shown for a six-cans configuration.

Figure 4:
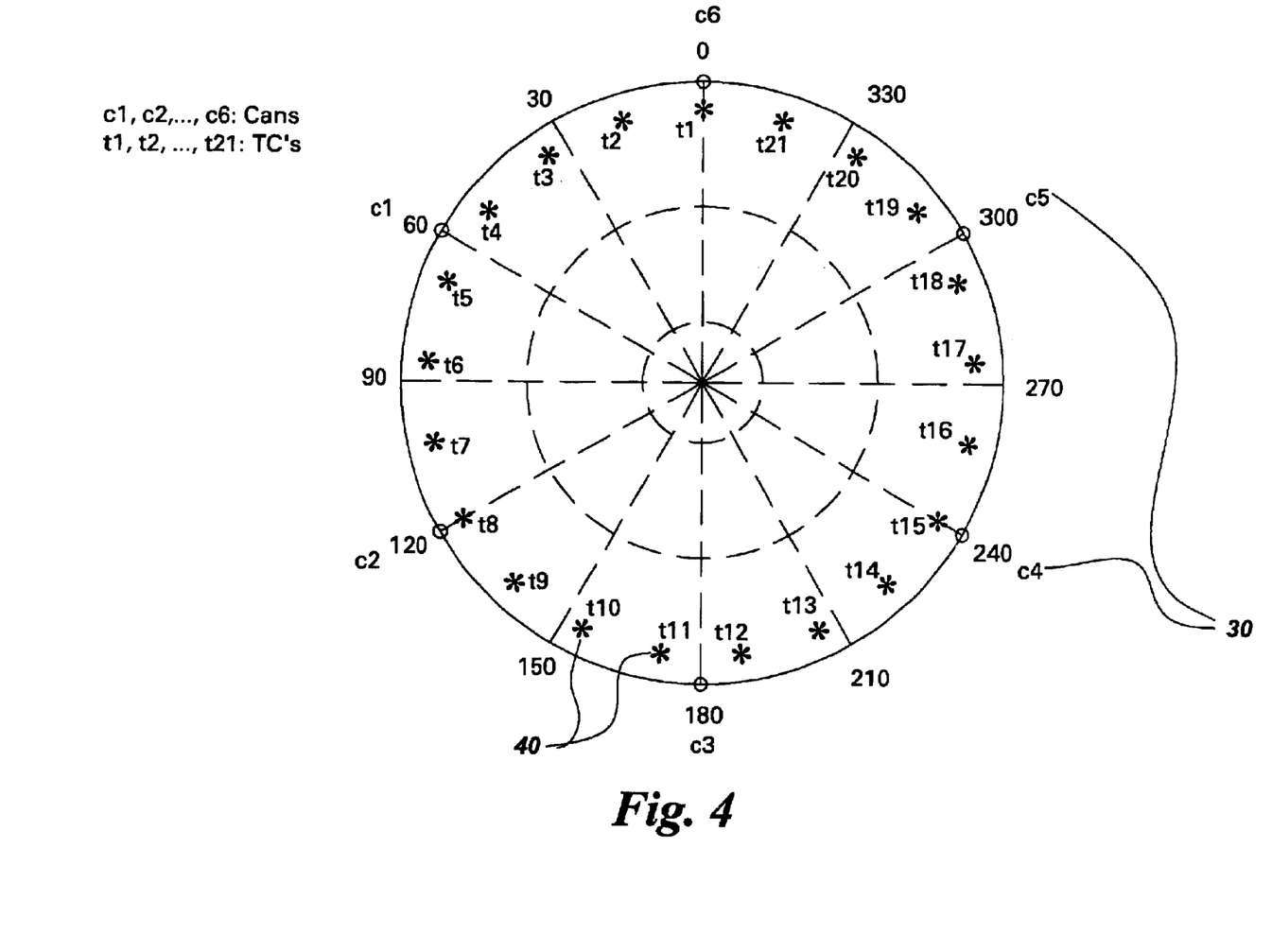
FIG. 4 illustrates a Can-Thermocouple geometry configuration.

In some embodiments, the data analysis module 60 further comprises a swirl model 70 to determine a correlation of at least one temperature measurements with corresponding individual combustor can as a function of at least one gas turbine operating parameter. The swirl model 70 correlates each local maximum point in the exhaust plane as described hereinabove with its corresponding combustor can over the entire range of operating conditions. FIG. 4 shows an example of combustor cans (shown by cn, where n is 1 to 6) and temperature sensors arrangement (shown by Thermocouples tm, where m is 0 to 21), where the angle between two temperature sensors is approximately 17 degrees. This correlation yields a swirl value, which is a measure of the angle through which exhaust gas rotates as it travels downstream from its issuance at a combustor can through the turbine section. The use of local exhaust gas temperature maxima as reference points gives the highest degree of confidence in the swirl value measurement, and hence the focus is to develop a correlation between gas turbine parameters and thermocouple number for each of the combustor can 40 using local maxima, although other points in the temperature profile may be used.

Figure 5:
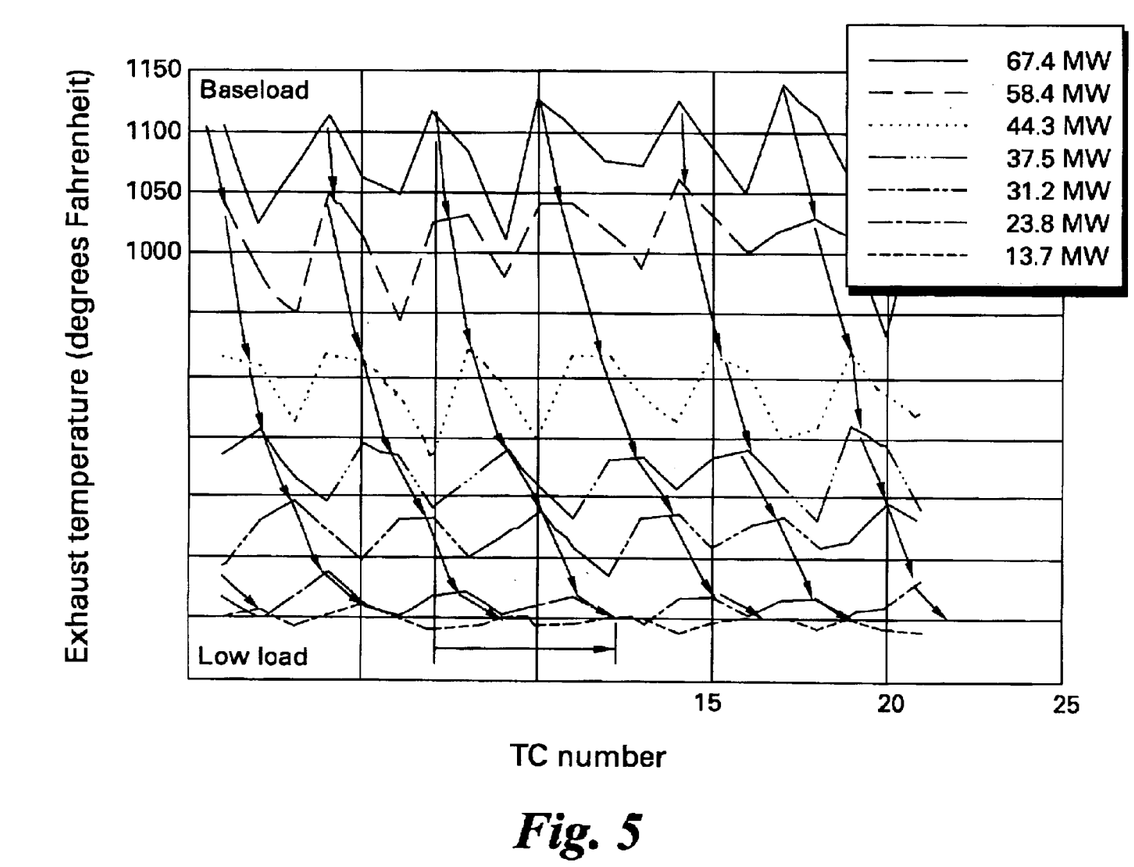
FIG. 5 illustrates swirl flow profiles for 6 cans operated from baseload to low load.
Figure 6:
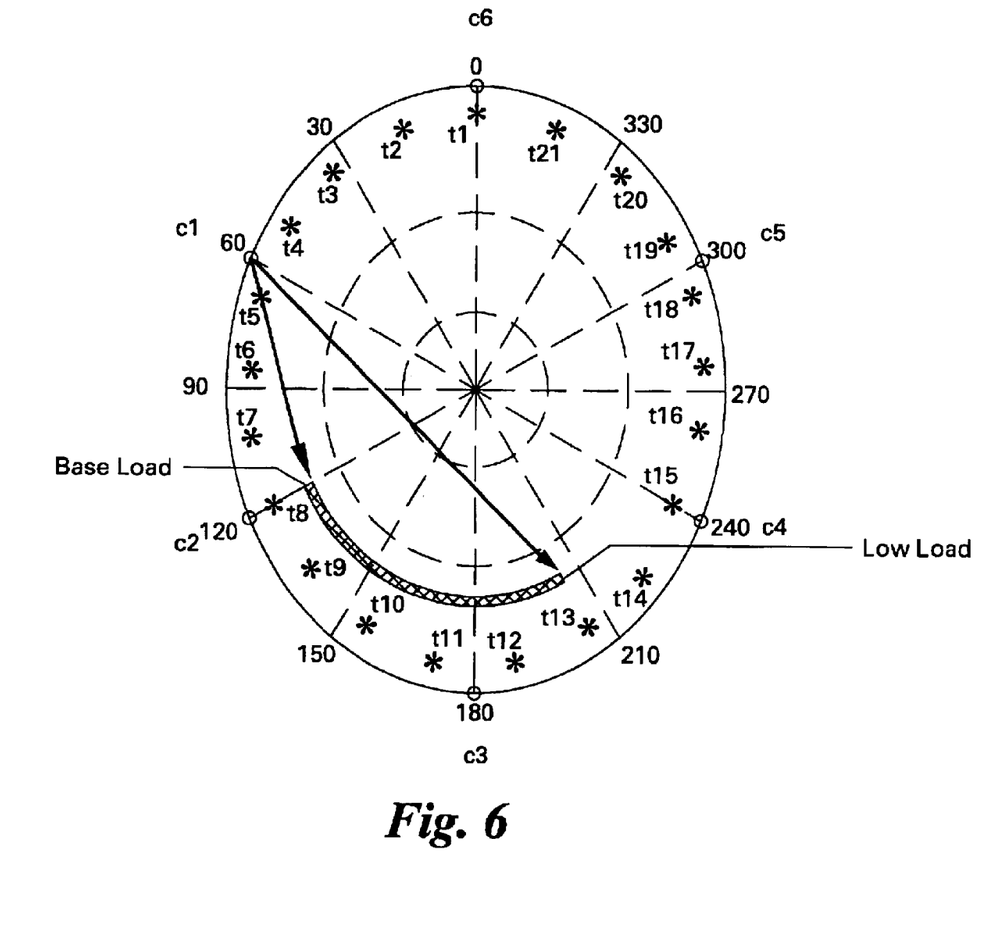
FIG. 6 illustrates a swirl range plot for 6 cans operated from base load to low load.

FIG. 5 shows an example of how the exhaust gas swirl manifests itself as the gas turbine operating conditions change. In the example shown in FIG. 5, the local maximum temperature data point corresponding to the exhaust gases from can #1 (c1) corresponds to Thermocouple (TC) #7 (t7) at base load conditions and the same point corresponds to Thermocouple #12 (t12) at low load conditions; the swirl value corresponding to can #1 is approximately 85 degrees (the angular distance between two thermocouples is approximately 17 degrees). Thus it is clear that amount of swirl is not linear with the load. Similarly, FIG. 6 depicts a swirl range plot showing an example of how the exhaust gas impinges on the thermocouples during the entire unload operation from base load of 90 MW to a low load of 10 MW. It shows that swirl changes from TC #8 (t8) to TC #13 (t13) over the complete unload cycle for can #1 (c1) and the swirl value is about 85 degrees. For developing a can-thermocouple map (i.e. a swirl map) the exhaust thermocouple data is analyzed to identify local maximum at discrete points along the load/unload operation. The time, thermocouple number and gas turbine operating parameters are captured for those points where the local maximum shifts from one thermocouple to the neighboring thermocouple during the load/unload operation. The correlation between the can number and the thermocouple number is recorded. The correlation data is then statistically analyzed to determine the relationships between the can number and the thermocouple number as a function of gas turbine operating parameters. A number of suitable statistical analysis techniques are known in the art, including, for example, linear regression, Principal Component Analysis (PCA), and Partial Latent Structure (PLS) mapping, for determining the relationship between gas turbine operating parameters and can-thermocouple correlation at all the operating points.

Figure 7:
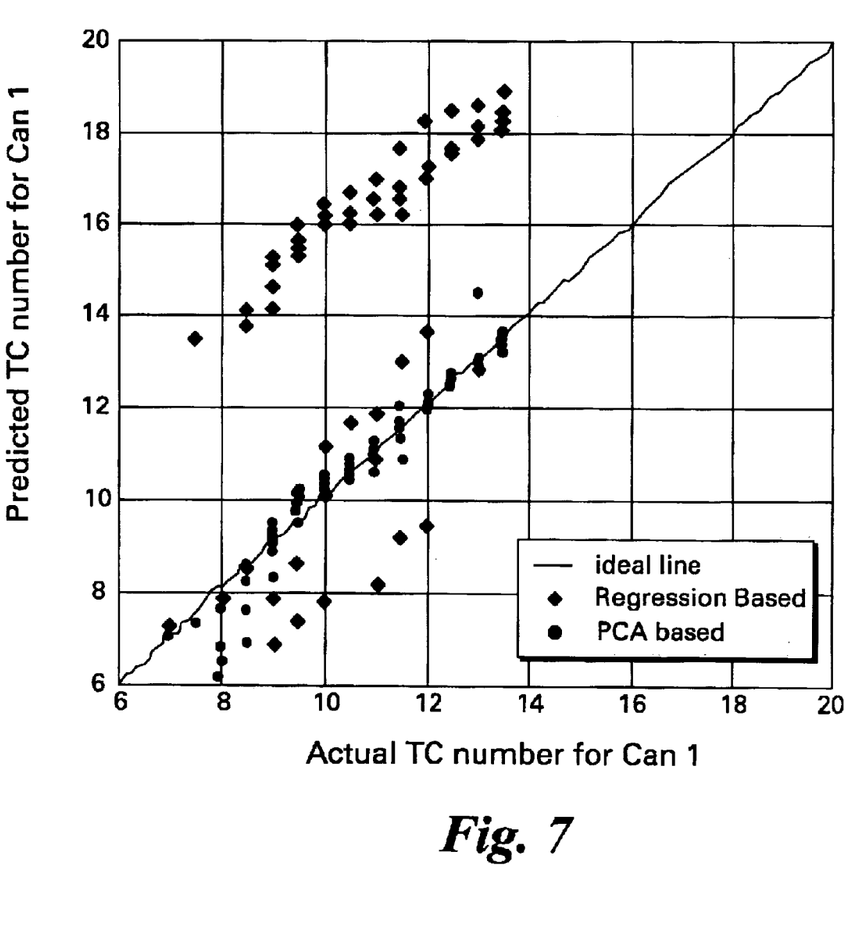
FIG. 7 illustrates a graphical comparison between least square and principal component analysis methodologies for swirl model development.

The results of analysis described hereinabove are used to develop a swirl model 70 for determining a swirl values as a function of gas turbine operating parameters. The swirl model 70 comprises a linear model in one example of the embodiment. In another example of the embodiment the swirl model 70 comprises a non-linear model. Model performance, as commonly done in the art, is evaluated based on maximum deviation (absolute value) of the model value from the observed value and the root mean square error. FIG. 7 shows a scatter plot for can #1 and the results from using least square method and results from PCA method.

It is observed that PCA gives more accurate results, which are closer to actual value (depicted by straight line). In an example, using the angular distance between two thermocouple approximately as 17 degrees, the model using PCA method was validated and it was found that the root mean square error of less than half the angular distance between the temperature sensors (approximately 8.5 degree) is achievable by PCA methodology.

Figure 8:
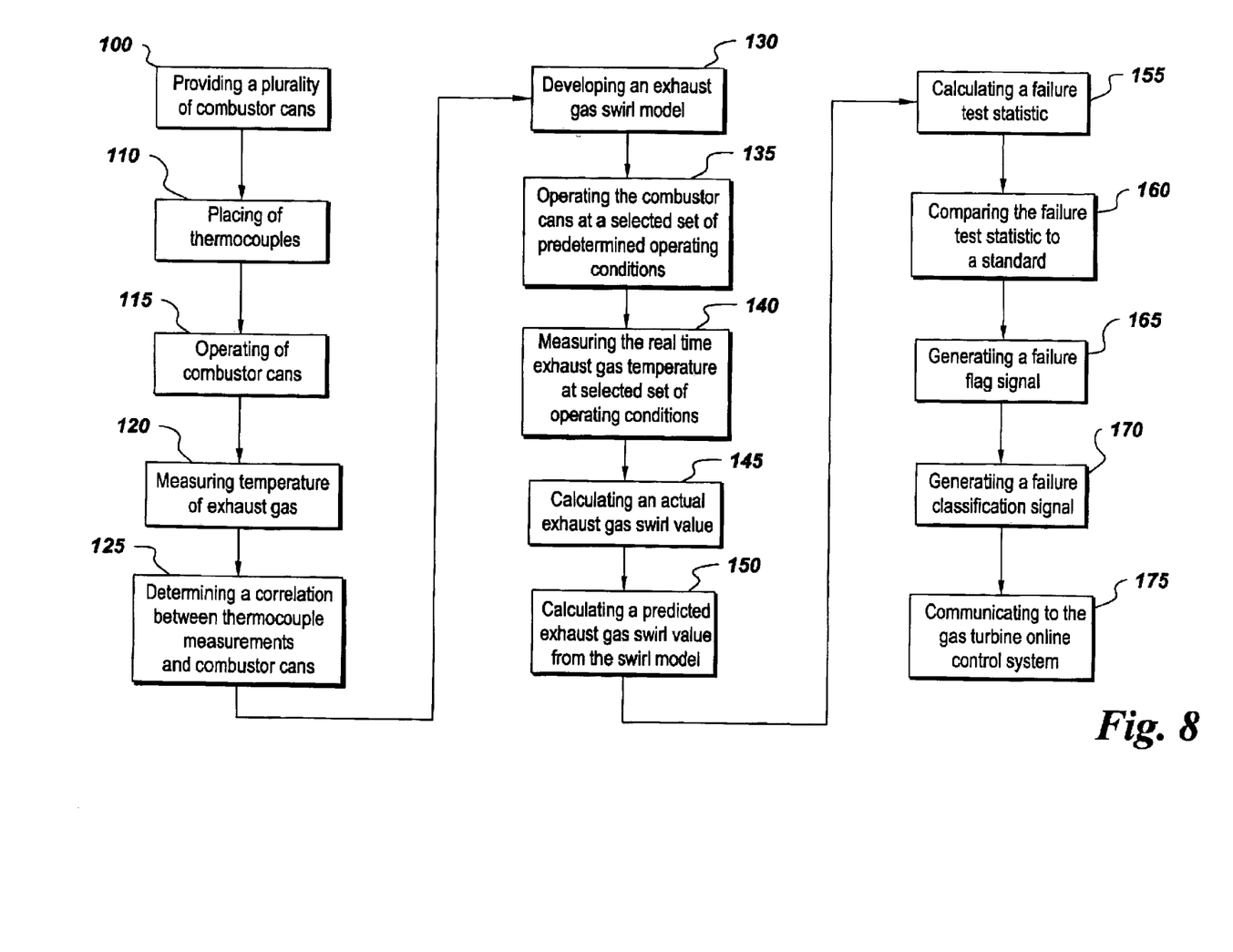
FIG. 8 illustrates a flow-chart describing the acts performed to monitor a gas turbine system performance.

Another aspect of the invention as shown in FIG. 8 is a method for monitoring a gas turbine system performance; the method is particularly suitable for the application of the aforementioned apparatus 10 (FIG. 1). It includes providing a plurality of combustor cans at 100; placing a plurality of temperature sensors circumferentially around an exhaust plane of the plurality of combustor cans at 110 and operating the plurality of combustor cans while varying a plurality of gas turbine operating parameters at 115. Varying a plurality of gas turbine operating parameters in specific embodiments, comprises varying each of the gas turbine operating parameters within a respective value range. The respective value range can range from a respective value used at a start-up condition to a respective value used at a base load condition for a plurality of combustor cans. Those skilled in the art will appreciate that the respective values for different operating parameters at startup and at base load conditions vary from turbine to turbine, and that these values are well defined for a given turbine. These gas turbine operating parameters in one example of the embodiment include at least one of inlet guide vane angle, compressor discharge pressure, fuel flow rate, compressor discharge temperature, corrected mass flow rate, output power. During the combustor can operation exhaust gas issues from each combustor can of the plurality of combustor cans. The method includes measuring the temperature of the exhaust gas in the exhaust plane using the plurality of temperature sensors at 120. The temperature sensors, in some embodiments are components of a temperature-monitoring portion of an online control system of the turbine. Measuring of the temperature includes obtaining an exhaust gas temperature profile within the exhaust plane in certain embodiments of the invention. This profile comprises a plurality of local maximum points, where each local maximum point corresponds to one of the combustor cans. A correlation is determined between individual temperature measurements of exhaust gas temperature and corresponding individual combustor cans issuing the exhaust gas at 125. Determining this correlation includes correlating each local maximum point of the plurality of local maximum points with its corresponding combustor can, as described previously. A swirl model 70 is developed at 130, where the model uses the correlation to determine a swirl value in the exhaust plane of exhaust gas issuing from individual combustor cans as a function of the gas turbine operating parameters. The model in one example of the method is a linear model. In another example the model is a non-linear model.

An alternate embodiment which can be used with the method described hereinabove or independently, comprises setting the plurality of combustor cans to operate at a selected set of predetermined operating conditions at 135 and measuring real-time exhaust gas temperature data during this operation at the selected set of operating conditions at 140. The real-time exhaust data is used to calculate an actual gas swirl value at 145. A predicted swirl value is also calculated at 150 for the selected set of operating conditions using the swirl gas model. The two values are compared at 155 and the difference between the values is calculated as a failure test statistic. The failure test statistic is compared to a standard at 160. When the failure test statistic exceeds the standard, a failure flag signal is generated at 165, which indicates a presence of a faulty can in the combustor. Next a failure classification signal is generated at 170, which identifies a particular can as a failed can by using the swirl map. The failure classification signal is sent to turbine online control system for appropriate corrective actions at 175.

The flow chart in FIG. 8 shows the functionality and operation of the method and the apparatus for monitoring a gas turbine performance. In this regard, each block/component represents a module, segment, or portion of code, which comprises one or more executable instructions for implementing the specified logical function(s). It should also be noted that in some alternative implementations, the functions noted in the blocks may occur out of the order noted in the figures or, for example, may in fact be executed substantially concurrently or in the reverse order, depending upon the functionality involved. Also, one of ordinary skill in the art will recognize that additional blocks may be added. Furthermore, the functions can be implemented in programming languages such as C++ or JAVA; however, other languages can be used.

The various embodiments and aspects of the invention described above comprise an ordered listing of executable instructions for implementing logical functions. The ordered listing can be embodied in any computer-readable medium for use by or in connection with a computer-based system that can retrieve the instructions and execute them. In the context of this application, the computer-readable medium can be any means that can contain, store, communicate, propagate, transmit or transport the instructions. The computer readable medium can be an electronic, a magnetic, an optical, an electromagnetic, or an infrared system, apparatus, or device. An illustrative, but non-exhaustive list of computer-readable mediums can include an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical).

Note that the computer readable medium may comprise paper or another suitable medium upon which the instructions are printed. For instance, the instructions can be electronically captured via optical scanning of the paper or other medium, then compiled, interpreted or otherwise processed in a suitable manner if necessary, and then stored in a computer memory.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. An apparatus for monitoring gas turbine system performance comprising:
    a sensor module adapted to sense a plurality of gas turbine operating parameters and temperature measurements during the operation of said gas turbine system, wherein said gas turbine system comprises a plurality of combustor cans;
    a data analysis module adapted to receive said plurality of gas turbine operating parameters and temperature measurements to generate at least one actual swirl value and at least one predicted swirl value;
    a statistic calculation module adapted to receive said at least one actual swirl value and said at least one predicted swirl value and to generate at least one failure test statistic; and a failure detection module adapted to receive said at least one failure test statistic and to generate at least one failure flag signal, wherein said at least one failure flag signal indicates a presence of a failed combustor can in said plurality of combustor cans.

2. The apparatus of claim 1, further comprising a failure classification module adapted to receive said at least one failure flag signal and to generate at least one failure classification signal, wherein said failure classification signal identifies a particular failed combustor can from among said plurality of combustor cans.

3. The apparatus of claim 1, wherein the data analysis module comprises a swirl model correlating each of said at least one temperature measurement to a corresponding individual combustor can as a function of said at least one operating parameter measurement.

4. The apparatus of claim 3, wherein said swirl model comprises a linear model.

5. The apparatus of claim 3, wherein said swirl model comprises developing a non-linear model.

6. The apparatus of claim 1, wherein the failure detection module is further adapted to compare said failure test statistic to a standard.

7. The apparatus of claim 1, wherein the failure test statistic is a difference between said actual swirl value and said predicted swirl value.

8. The apparatus of claim 1, further comprising a measurement-recording module adapted to record and store said plurality of gas turbine operating parameters and temperature measurements.

9. The apparatus of claim 1, wherein said gas turbine operating parameters further comprise at least one of inlet guide vane angle compressor discharge pressure, fuel flow race, compressor discharge temperature, corrected mass flow rate, output power.

10. The apparatus of claim 1, wherein said sensor module comprises a plurality of temperature sensors and wherein said plurality of temperature sensors is a component of a temperature-monitoring portion of an online control system of said turbine.

* * * * *